US 8,248,426 B2

(12) United States Patent
Sanami

(10) Patent No.: US 8,248,426 B2
(45) Date of Patent: Aug. 21, 2012

(54) IMAGE PROCESSING APPARATUS FOR DISPLAYING COLORS INCLUDED IN A COLOR IMAGE AND AN IMAGE PROCESSING METHOD, AND A STORAGE MEDIUM THEREFOR

(75) Inventor: Hiroyuki Sanami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 567 days.

(21) Appl. No.: 11/460,808

(22) Filed: Jul. 28, 2006

(65) Prior Publication Data

US 2007/0030501 A1    Feb. 8, 2007

(30) Foreign Application Priority Data

Aug. 3, 2005    (JP) .................. 2005-225846

(51) Int. Cl.
*G09G 5/00*    (2006.01)
*G09G 5/02*    (2006.01)
*H04N 5/228*    (2006.01)
*H04N 9/73*    (2006.01)
*H04N 9/64*    (2006.01)
*H04N 5/14*    (2006.01)
*H04N 1/46*    (2006.01)
*G03F 3/08*    (2006.01)
*G06K 9/00*    (2006.01)
*G06K 9/20*    (2006.01)
*G06K 9/40*    (2006.01)

(52) U.S. Cl. ............ 345/581; 345/589; 348/222.1; 348/223.1; 348/650; 348/672; 358/518; 358/520; 358/537; 358/538; 382/162; 382/167; 382/274; 382/282

(58) Field of Classification Search .......... 345/581, 345/589; 348/222.1–223.1, 650, 672; 358/518–522, 358/537–538; 382/162, 167–172, 274, 282
See application file for complete search history.

(56) References Cited

U.S. PATENT DOCUMENTS

| | | | |
|---|---|---|---|
| 6,647,143 B1 * | 11/2003 | Nakashima | 382/166 |
| 2003/0151611 A1 * | 8/2003 | Turpin et al. | 345/589 |
| 2004/0239928 A1 * | 12/2004 | Masuda | 356/326 |
| 2006/0176311 A1 | 8/2006 | Kimoto et al. | |

FOREIGN PATENT DOCUMENTS

| | | | |
|---|---|---|---|
| JP | 05-073667 A | | 3/1993 |
| JP | 05073667 A | * | 3/1993 |
| JP | 2678171 B2 | | 11/1997 |
| JP | 11-306334 A | | 11/1999 |
| JP | 2005-045769 A | | 2/2005 |

OTHER PUBLICATIONS

URL (http://support.adobe.co.jp/faq/faq/qadoc.sv?3200+001), Apr. 17, 2006.

* cited by examiner

*Primary Examiner* — Tize Ma
(74) *Attorney, Agent, or Firm* — Canon USA Inc. IP Division

(57) ABSTRACT

The present invention enables a user to easily identify individual colors included in a color image. Specifically, a color image is divided into two or more areas based on colors, and based on the feature values for the individual areas obtained by division, the order of the colors is changed. Then, the colors of the individual areas are displayed in accordance with the changed order.

5 Claims, 9 Drawing Sheets

IMAGE PROCESSING APPARATUS FOR DISPLAYING COLORS INCLUDED IN A COLOR IMAGE AND AN IMAGE PROCESSING METHOD, AND A STORAGE MEDIUM THEREFOR

BACKGROUND OF THE INVENTION

1. Field of the Invention

The present invention relates to an image processing apparatus that displays individual colors included in a color image, an image processing method and a storage medium therefor.

2. Description of the Related Art

Conventionally, a technique that employs an automatic selection tool in a graphics editing mode of an application program called Adobe Photoshop is known as a technique for selecting and changing part of the colors in a color image displayed on a personal computer.

Specifically, when a user employs the automatic selection tool and uses a pointing device to click on a specific point in a color image, only an area having a color similar to that at the clicked point is selected. Then, a color change is performed for the selected area.

However, according to this method, the range of a selected color differs greatly, depending on a permissible value. Therefore, for a color image that includes noise, it is difficult to designate a permissible range for the selection of a desired area.

As another conventional method, a color image is displayed on an image display apparatus, as are color palette data that are added to the color image, and when a user selects a color to be changed, palette data that include a color that is similar to the selected color are selected and displayed as a similar color list. Then, after a user has designated a color to be changed to, the colors displayed on the similar color list are collectively changed to the designated color.

However, this method can not be applied for a common image to which color palette data have not been added.

Further, when a user refers to color palette data to select a color, the user can not easily identify which colors are main colors and which are not main colors.

SUMMARY OF THE INVENTION

The present invention allows a user to easily identify individual colors included in a color image.

According to an aspect of the present invention, an image processing apparatus includes: an area division unit configured to divide a color image into a plurality of areas based on colors; a feature value calculation unit configured to calculate pixel counts and representative colors for the areas obtained by division; a rearrangement unit configured to employ the pixel counts to change the order of the representative colors for the areas; and a display unit configured to display the representative colors for the areas in accordance with the changed order.

According to another aspect of the present invention, an image processing method includes: dividing a color image into a plurality of areas based on colors; calculating pixel counts and representative colors for the areas obtained by division; changing the order of the representative colors for the areas based on the pixel counts that are obtained; and displaying the representative colors for the areas in accordance with the order.

Other features of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

First Embodiment

Figure 1:
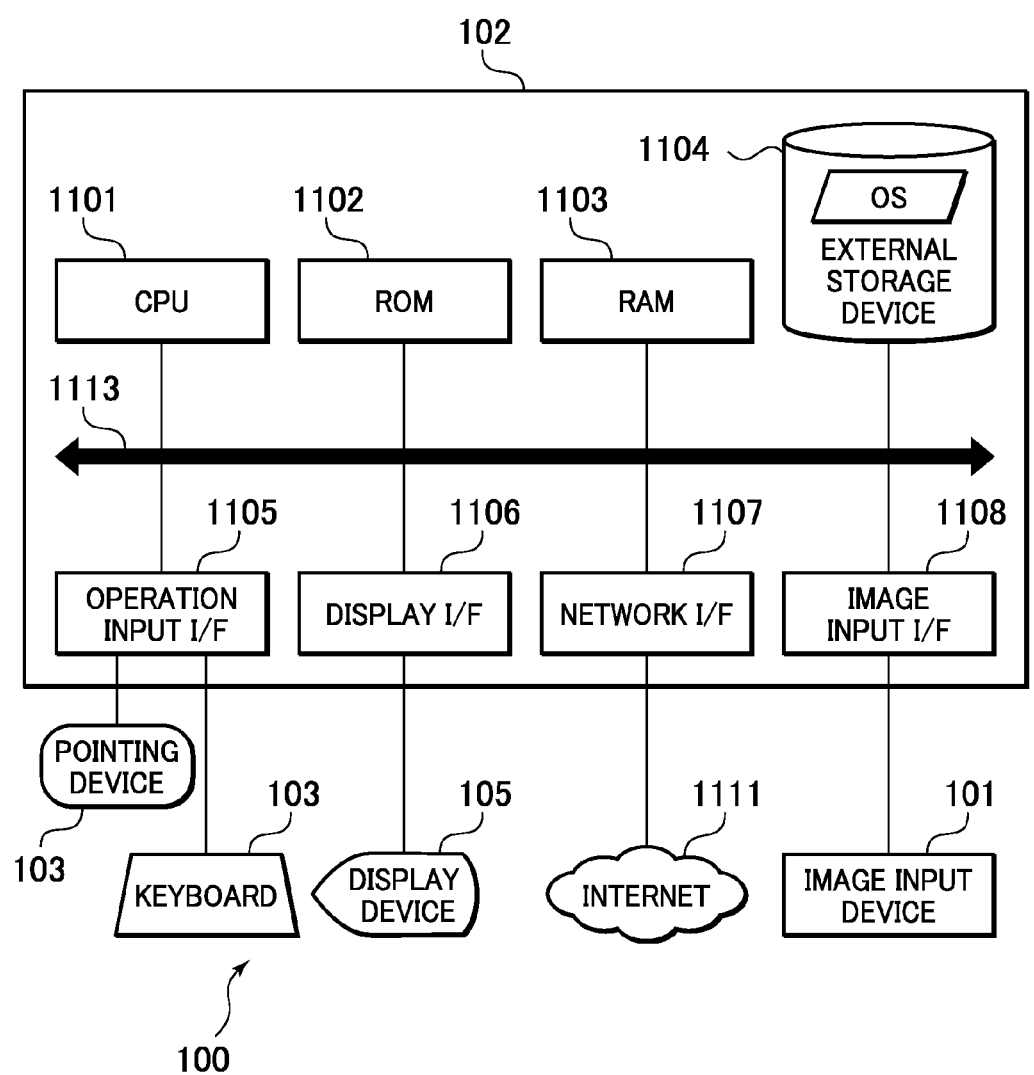
FIG. 1 is a block diagram illustrating an example configuration of an image processing apparatus according to a first embodiment of the present invention.

FIG. 1 is a block diagram illustrating the general configuration of an image processing apparatus according to a first embodiment of the present invention.

In FIG. 1, an image processing apparatus 100 includes: an image input device 101, which fetches an image as digital data; a computer 102, which executes an image processing program; and input devices 103, which are manipulated by a user to enter an image processing command or a screen manipulation command.

The input devices 103 shown in the exemplary image processing apparatus of FIG. 1 are a keyboard and a pointing device, such as a mouse.

The image processing apparatus 100 also includes a display device 105, which displays image processing results, data held by the computer 102 and data supplied by an external device.

The image input device 101 may be, for example, a compact disk (CD) drive, a scanner, a digital camera, a personal computer (PC) card, a floppy disk, a magneto-optical (MO) device, a ZIP drive, a file system, a combination of the above or the like.

The computer 102 includes: a central processing unit (CPU) 1101, which controls the image processing apparatus 100; and a read only memory (ROM) 1102, in which a program for which changes are not required and parameters are stored.

The computer 102 also includes: a random access memory (RAM) 1103, in which a program and data supplied by an external device are temporarily stored; and an external storage device 1104, on which an operating system (OS) and an image processing program are stored.

The RAM 1103 is used to temporarily store image and other data, and calculation results obtained during an operation. The external storage device 1104 may be provided for the computer 102, and may be either fixed or detachable.

A hard disk or a memory card, for example, is employed as the external storage device 1104 fixed to the computer 102.

Further, an optical disk, such as a flexible disk (FD) or a compact disk (CD), a magnetic card, an optical card, an integrated circuit (IC) card or a memory card, for example, is employed as the detachable external storage device 1104 provided for the computer 102.

The computer 102 also includes: an operation input interface (I/F) 1105, which is an interface used for the input devices 103; a display I/F 1106, which is an interface used for the display device 105; a network interface I/F 1107, which is a network interface used for a connection with the Internet 1111; and an image input I/F 1108, which is an interface used for the image input device 101.

These components of the computer 102 are interconnected by a system bus 1113.

In this embodiment, the computer 102 is the only computer in the image processing apparatus 100; however, functions may be distributed among a plurality of computers, as needed, to provide the image processing apparatus 100.

In such a case, the computers are connected via a local area network (LAN), so they can communicate with each other.

Furthermore, the computer 102 is connected to the Internet 1111 via the network I/F 1107; however, the network communication line is not limited to use with the Internet.

Figure 2:
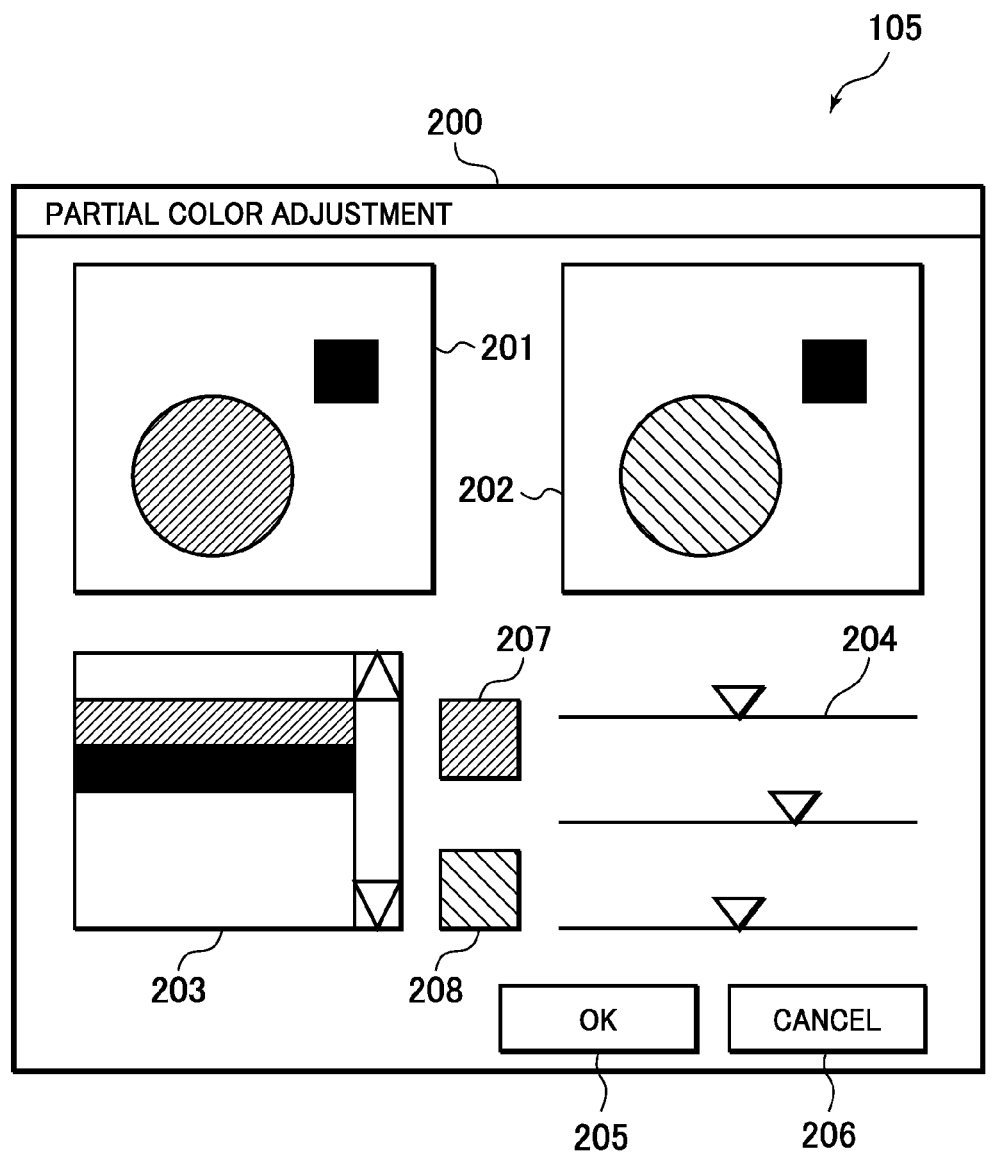
FIG. 2 is a diagram illustrating an example application screen displayed by the image processing apparatus according to the first embodiment.

FIG. 2 illustrates an example application screen that is displayed on the display device 105 when the CPU 1101 of the computer 102 has executed the image processing program.

In FIG. 2, an application screen 200 includes: an original image display window 201, for displaying an image that has been entered by the image input device 101 and has to be corrected; and a corrected image display window 202, for displaying an image obtained after color correction has been performed.

The application screen 200 also includes: a color list box 203, for displaying a list of colors to be used in an image to be corrected; and color adjustment slide bars 204, which are used to set a correction value for a selected color.

Furthermore, the application screen 200 includes: an OK button 205, which is used to establish a process in response to a selection made in response to an entry made by a user; and a cancel button 206, which is used to cancel and end the process.

Further, the application screen 200 includes a selected color preview window 207, for displaying a color that has been selected in the color list box 203 or the original image display window 201.

Moreover, the application screen 200 includes: a corrected color preview window 208, for displaying a color obtained by correcting a color that is displayed in the selected color preview window 207 and that is based on a correction value that has been set by using the color adjustment slider 204.

When a user selects one of the colors on the list displayed in the color list box 203, the computer 102 sets the selected color as a color to be corrected.

Further, based on a correction value set along the color adjustment slide bar 204, the computer 102 performs color correction for the color selected in the color list box 203.

The color correction processing performed by the image processing apparatus 100 will now be described while referring to FIG. 3.

Figure 3:
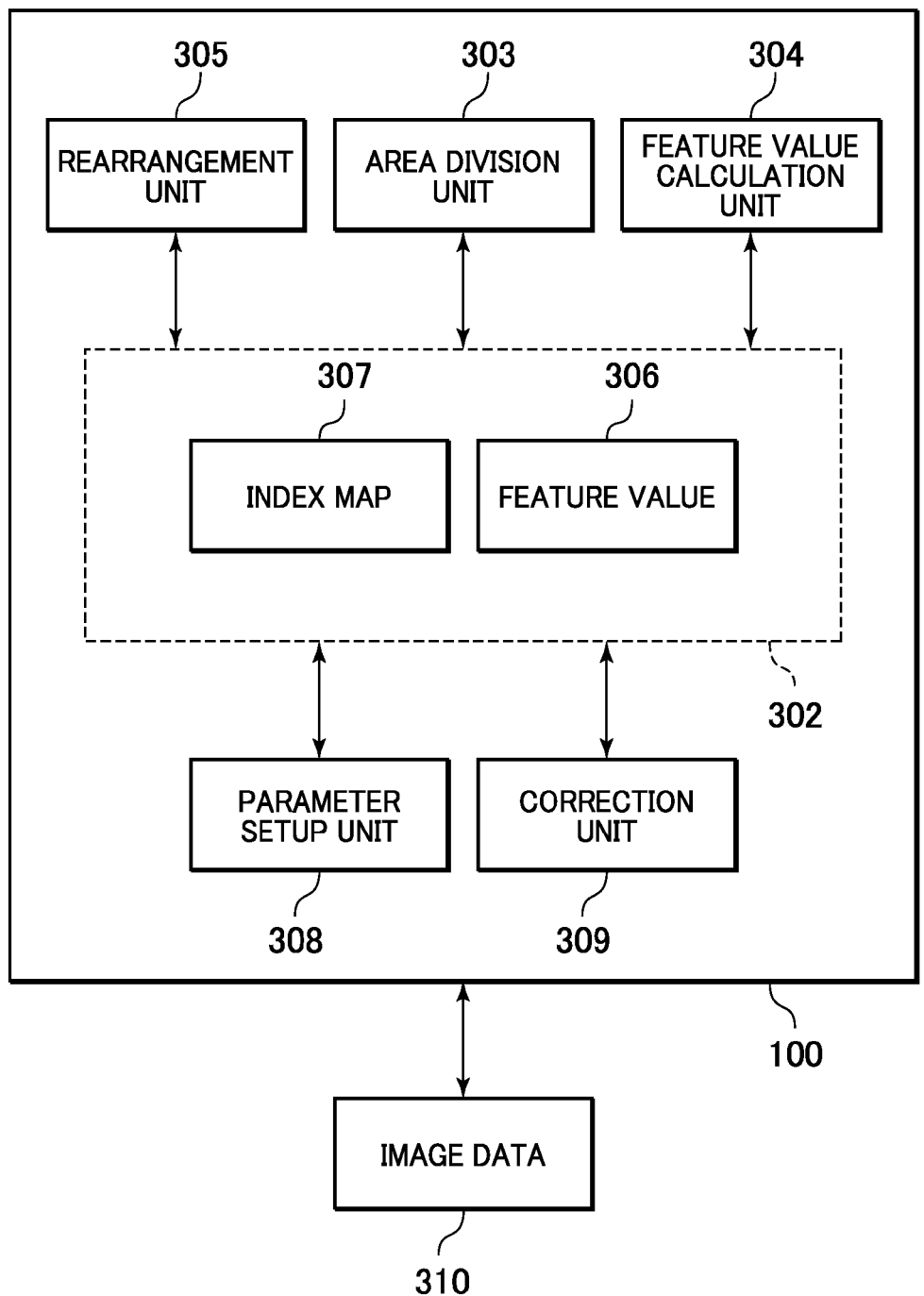
FIG. 3 illustrates color correction processing performed by an image processing apparatus according to the first embodiment.

In FIG. 3, the image processing apparatus 100 includes: a storage area 302, for storing temporary data used by the computer 102; and an area division unit 303, for dividing an area of input image data 310.

The image processing apparatus 100 includes a feature value calculation unit 304, which calculates, as a feature value for this embodiment, the number of pixels in each of the divided areas and a representative color for the areas; a rearrangement unit 305, which rearranges the colors of the individual areas based on the feature values obtained by the feature value calculation unit 304; and a display unit, which displays the colors of the individual areas in the color list box 203 in the order in which they are rearranged by the rearrangement unit 305.

The image processing apparatus 100 also includes, in the storage area 302: feature values 306, which represent calculation results obtained by the feature value calculation unit 304; and an index map 307, in which areas obtained by the area division unit 303 are stored.

Further, the image processing apparatus 100 includes: a parameter setup unit 308, which selects an area to be corrected and sets a correction value; and a correction unit 309, which, based on the correction value, performs a color correction process for the area, designated by the parameter setup unit 308, that is to be corrected.

The image processing apparatus 100 includes image data 310, to be corrected, that are entered by the image input device 101.

So long as the feature values 306 of the individual areas can be calculated, the feature value calculation unit 304 is not limited to the one shown in this embodiment and, for example, a luminance level may be calculated as a feature value 306.

Figure 4:
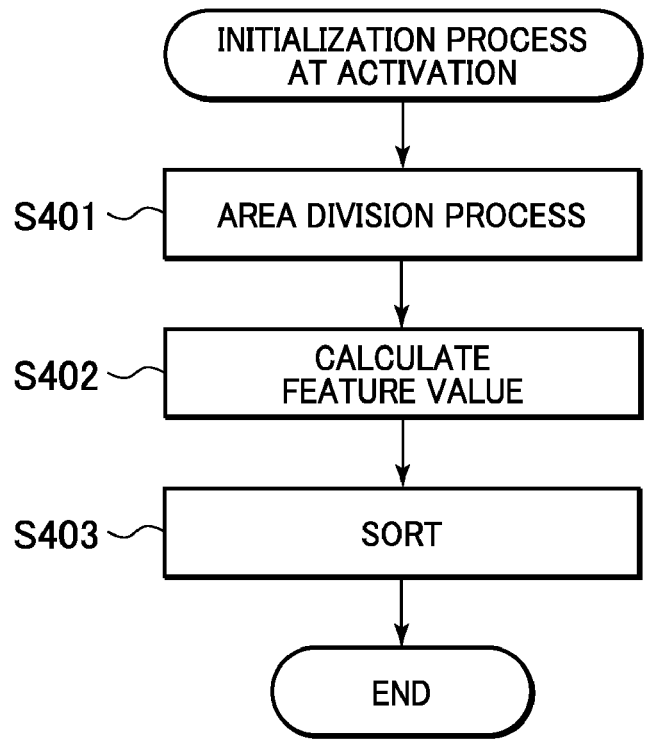
FIG. 4 is a flowchart illustrating processing performed by the image processing apparatus of the first embodiment for displaying a list of colors included in an image.

FIG. 4 is a flowchart showing exemplary initialization processing. This processing is performed by the CPU 1101, in the computer 102 of the image processing apparatus 101, in accordance with an image processing program.

To perform this processing, first, at the time of activation, the image data 310 to be corrected are analyzed, and the area of the image data 310 is divided, internally.

While referring to FIG. 4, first, the computer 102 employs the area division unit 303 to perform the area division process shown in FIG. 5, which will be described later, for the image data 310 that are entered by the image input device 101. The area division and the color reduction processes are performed for the image data 310, and the obtained areas are held in the index map 307 (step S401).

Then, the computer 102 employs the feature value calculation unit 304 to calculate the feature values 306 for the individual areas (step 402). In this embodiment, a pixel count sum and representative colors RGB are obtained as a feature value. Specifically, the areas stored in the index map 307 are scanned, and pixel counts for the individual areas and average values for RGB values of the image data 310 are obtained. As described above, since an image in each area is obtained after the color reduction process is performed and is converted into an area mask for one channel and this mask is employed to calculate the feature values 306, the feature values 306 can be quickly calculated. It should be noted that the representative color is the color that most frequently appears in the histogram for each area.

By employing, as references, the feature values 306 obtained at step S402, the computer 102 employs the rearrangement unit 305 to change the order in which the colors of the areas in the color list box 203 are displayed (step S403). Thereafter, in accordance with the display order obtained at step S403, the computer 102 displays the colors in the individual areas in the color list box 203 and terminates this processing.

At step S403 in this embodiment, the computer 102 rearranges the colors so that they are displayed beginning with the largest number of pixels in the feature values 306. It should be noted that quick sorting can be employed as a sorting algorithm. Further, the computer 102 stores, in the storage area 302, the order for the display of the colors in the color list box 203.

Figure 5:
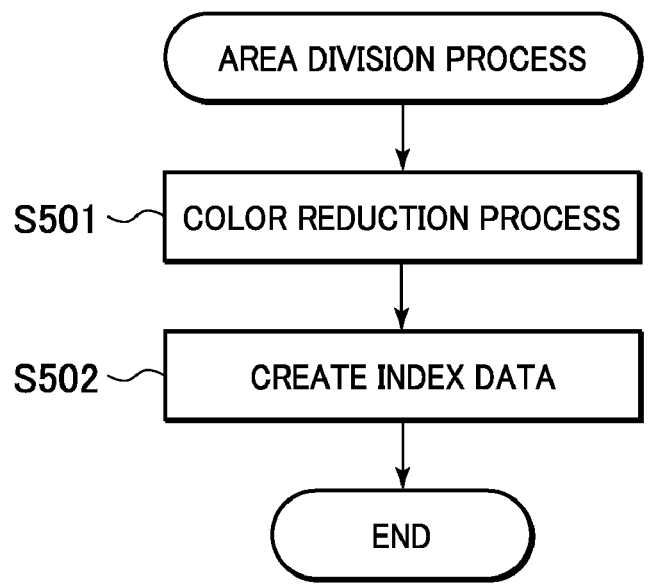
FIG. 5 is a flowchart illustrating area division processing performed by the image processing apparatus of the first embodiment.

FIG. 5 is a flowchart showing exemplary processing for the area division process at step S401 in FIG. 4.

While referring to FIG. 5, first, the computer 102 reduces the number of colors in an input image, for example, to 64 colors (step S501). During this color reduction process, RGB colors, each of which is expressed using 256 gray levels, are mechanically reduced to 4 gray levels each, so that 4*4*4=64 colors are obtained.

Next, indexes are allocated for the colors reduced at step S501, and for the areas used to prepare index data. Then, the index data are stored as internal data in the index map 307 (step S502). The area division processing is thereafter terminated and processing returns (e.g., to step S402 of FIG. 4).

In this embodiment, the area division process is performed based on colors (step S401 in FIG. 4 and FIG. 5), the feature values 306, such as pixel counts, for individual areas are calculated (step S402 in FIG. 4), and the order in which colors are displayed in the color list box 203 is rearranged, based on the feature values 306 (step S403 in FIG. 4).

As a result, since a user can easily identify the main colors for an image, the user can easily select a color to be corrected.

Figure 6:
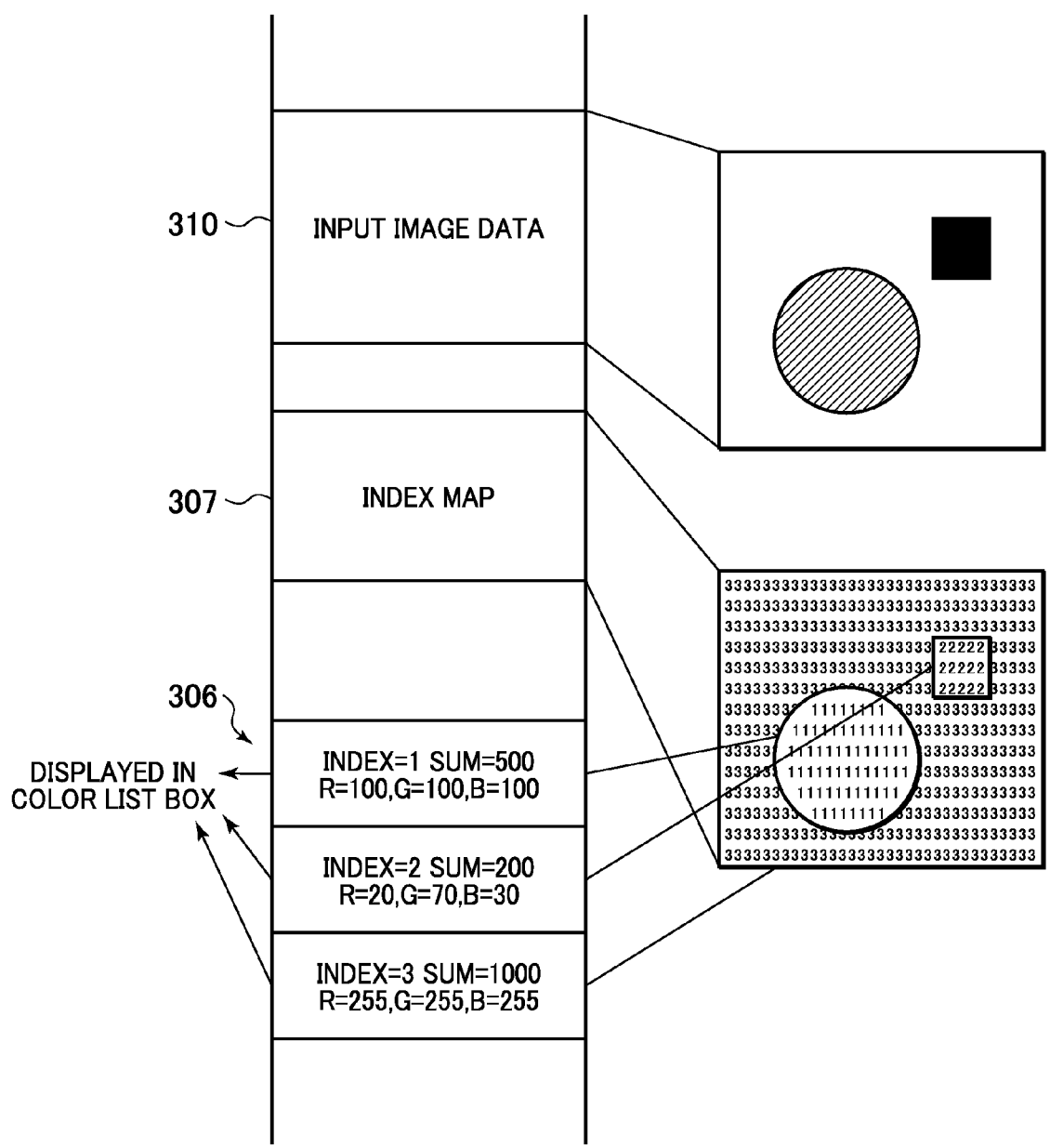
FIG. 6 is a diagram illustrating the state of a storage area and a correlation between data.

FIG. 6 illustrates an exemplary state of the storage area 302 after the initialization process in FIG. 4 has been performed, and a correlation between data.

The input image data 310, the index map 307 and the generated feature values 306 for the areas are stored in the storage area 302. The areas stored in the index map 307 correspond to the feature values 306 for the individual areas.

The color correction for the input image data 310 is performed as follows. The computer 102 obtains, from the index map 307, index data that correspond to a color that is selected, by a user, from those in the color list box 203. Then, the computer 102 determines an area that corresponds to the index data as a correction target area, and employs a designated correction value to perform the correction process for the individual pixels of the image data 310 present in the correction target area. Through this process, a corrected image is obtained by the computer 102. At the same time, the computer 102 obtains the representative RGB color that is included in the feature value 306, which corresponds to the index data. The computer 102 performs the same correction process for this color, and displays the corrected color in the corrected color preview window 208.

In the above described correction process, since a color can be selected from the color list box 203, a user can easily select a color to be adjusted.

A color to be corrected may be designated in the following manner. The computer 102 determines to which of the areas stored in the index map 307 a point (X, Y), selected in the image data 310 in accordance with a user's instruction belongs. Then, the computer 102 calculates the feature value 306 for the area to which the point belongs.

Thereafter, when a correction value for the point (X,Y) has been designated by the user, the computer 102 obtains as correction target areas all the areas that are stored in the index map 307 and that correspond to the feature values 306 that have been obtained.

Sequentially, based on the correction value, the computer 102 performs the correction process for the individual pixels in the image data 310 that are present in the obtained correction target areas. As a result, the computer 102 obtains a corrected image.

At the same time, the computer 102 obtains the representative RGB color included in the feature value 306, and performs the correction process for this color. Thereafter, the computer 102 displays the corrected color in the corrected color preview window 208.

During the above described color correction process, the user can select a color in image data while referring to colors displayed in the color list box 203, and the color correction process is performed for an area that corresponds to the selected color. Therefore, color adjustment for the portion desired by a user can be efficiently performed.

In this embodiment, a simple color reduction has been performed during the area division process in FIG. 5. However, a color reduction process employing a more complicated algorithm may be performed.

Furthermore, in this embodiment, the areas obtained by division have been employed. However, the combining of areas may be performed, as needed, depending on the division results, and the number of colors displayed in the color list box 203 may be reduced.

Further, in this embodiment, quick sorting has been employed as the sorting algorithm for the rearrangement unit 305. However, another well known algorithm, such as bubble sorting, may be employed.

In addition, in this embodiment, the rearrangement unit 305 has sorted the colors based on the number of pixels; however, another indicator, such as a hue or a luminance level, may be employed for sorting. Further, the sorting order is in the descending order of pixels. Colors, however, may be arranged in the ascending order of pixels, or in order, beginning with the nearest area, in accordance with the coordinate position, by determining the adjacency conditions of areas.

Moreover, in this embodiment, the color correction algorithm employed by the correction unit 309 is formed using only RGB. However, instead of RGB, the color space, such as the HSV or HSL color model or the Lab or YCbCr color system, or a combination of them may be employed.

In this embodiment, the linear color adjustment algorithm has been employed by the correction unit 309. However, a curved algorithm may be employed.

Second Embodiment

The color correction process for an image according to a second embodiment of the present invention will now be described while referring to FIG. 7. This processing is to be performed by a CPU 1101, for a computer 102 of an image processing apparatus 700, in accordance with an image processing program.

Figure 7:
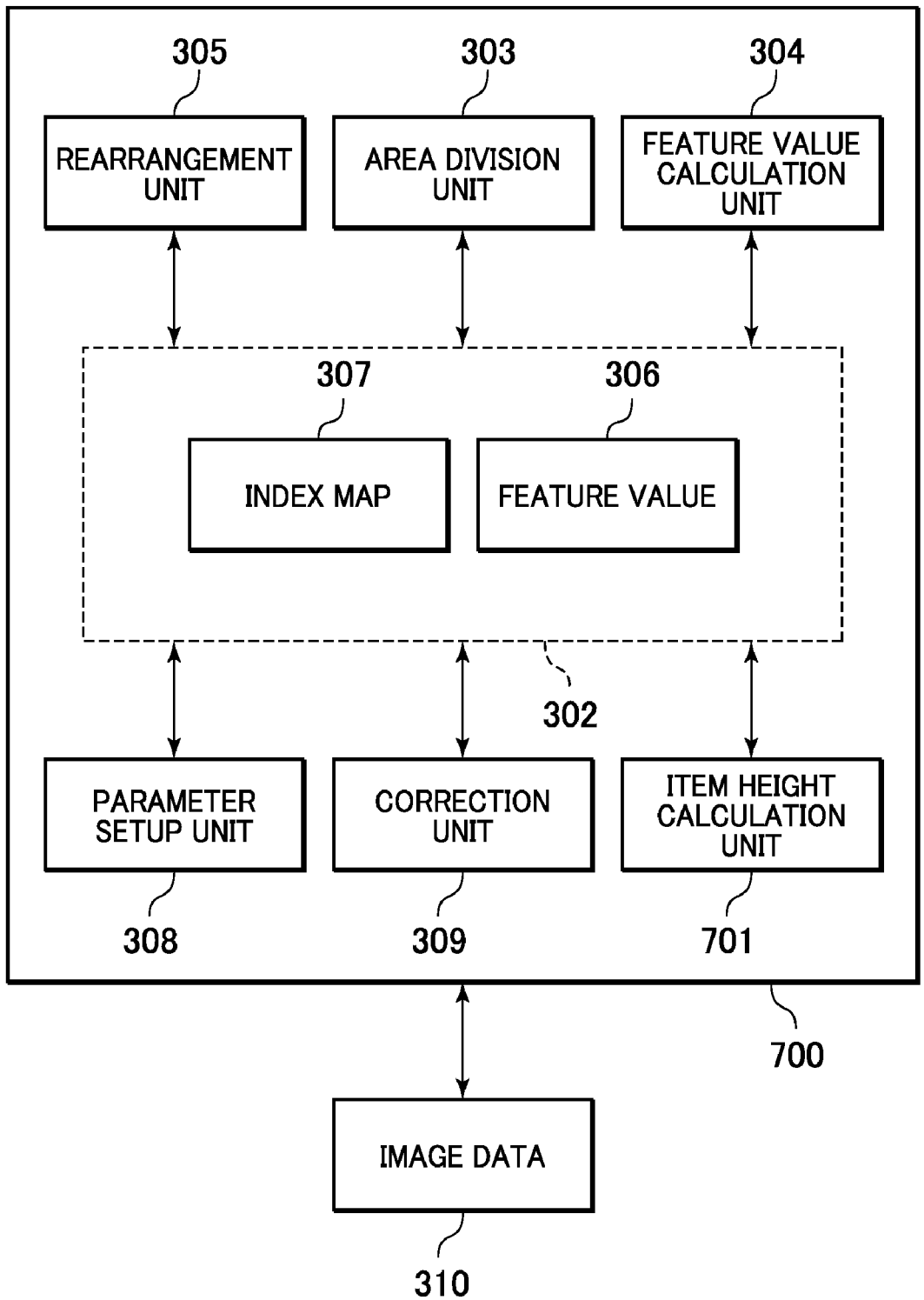
FIG. 7 illustrates color correction processing performed by an image processing apparatus according to a second embodiment of the present invention.

The image processing apparatus 700 in FIG. 7 includes a list item height calculation unit 701 in addition to the components in FIG. 3. In FIG. 7, the same reference numerals as are used in FIG. 3 are provided for the components that correspond to those in FIG. 3. A detailed explanation will now be given for a component unique to the image processing apparatus 700 of this embodiment.

In accordance with pixel counts sum included in feature values 306, the list item height calculation unit 701 calculates the heights of the positions at which colors are displayed in a color list box 803 in FIG. 8, which will be described later. In accordance with the calculated values, the heights of the display positions and the display widths of the individual colors in the color list box 803 are changed, so that a user can identify the main color in the image data 310.

Figure 8:
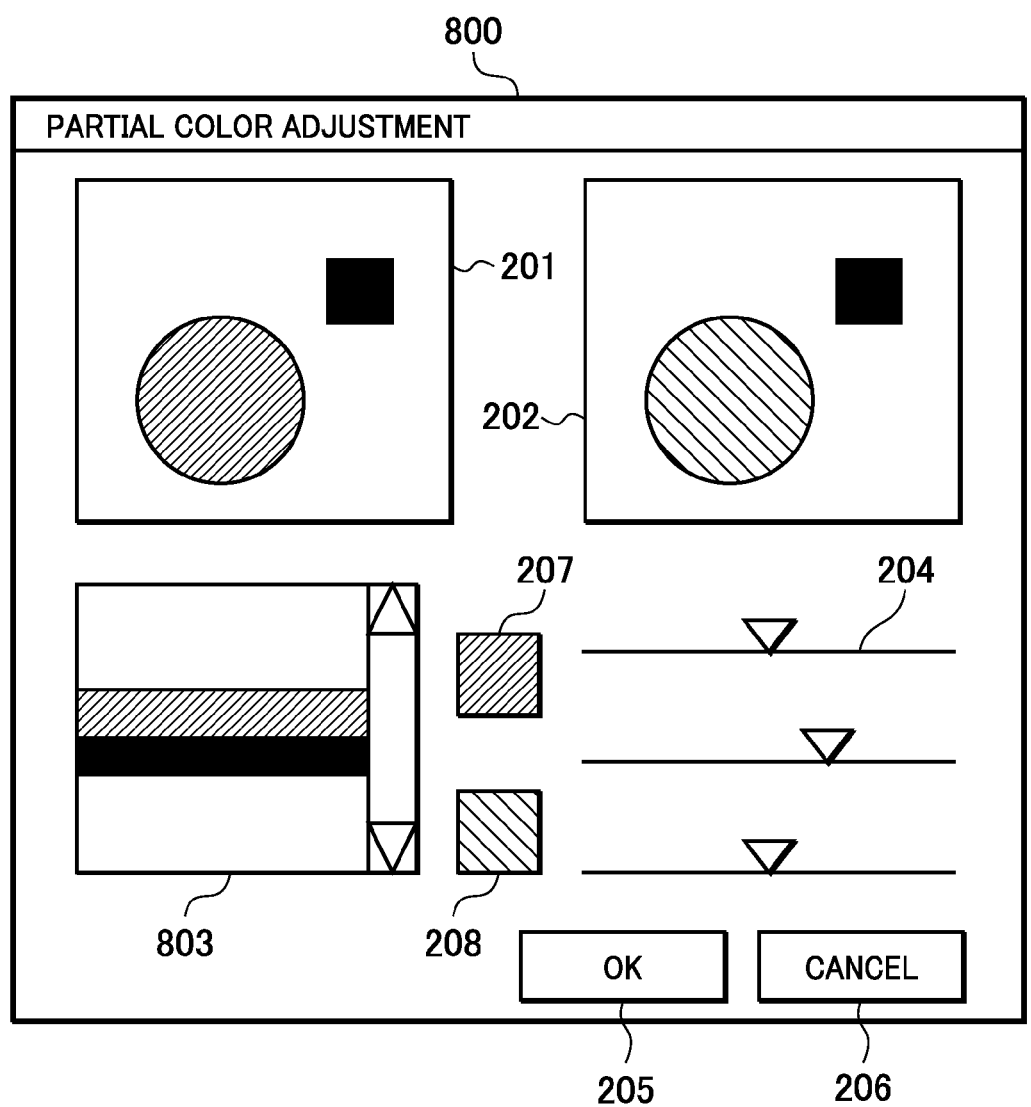
FIG. 8 shows an example application screen displayed by the image processing apparatus of the second embodiment.

FIG. 8 is a diagram showing an application screen 800 displayed by a display device 105 when the CPU 1101 for the computer 102 of the image processing apparatus 700 has performed the image processing program.

Since the structure of the application screen 800 in FIG. 8 is basically the same as that of the application screen 200 in FIG. 2, the same reference numerals used in FIG. 2 are provided for corresponding components, and only those components that are different will be explained in detail below.

In the application screen 800 in FIG. 8, instead of the color list box 203 in FIG. 2, a color list box 803 is prepared in which, among the colors for image data 310 to be corrected, the display width is extended for colors that have a large pixel count sum in the feature value 306 and that are displayed at a high position. A rearrangement unit 305 sorts colors in accordance with the display heights for individual colors that are calculated by the list item height calculation unit 701.

The computer 102 displays individual colors in the color list box 803 in the order determined by the rearrangement unit 305 and with the display widths that are based on the values obtained by the list item height calculation unit 701.

In this embodiment, the individual colors may be sorted by the rearrangement unit 305 in the order of hues, and may be displayed in the color list box 803 with the display widths that are based on the values obtained by the list item height calculation unit 701.

Third Embodiment

The color correction process for an image according to a third embodiment of the present invention will now be described while referring to FIG. 9. This processing is to be performed by a CPU 1101 for a computer 102 of an image processing apparatus 900 in accordance with an image processing program.

Figure 9:
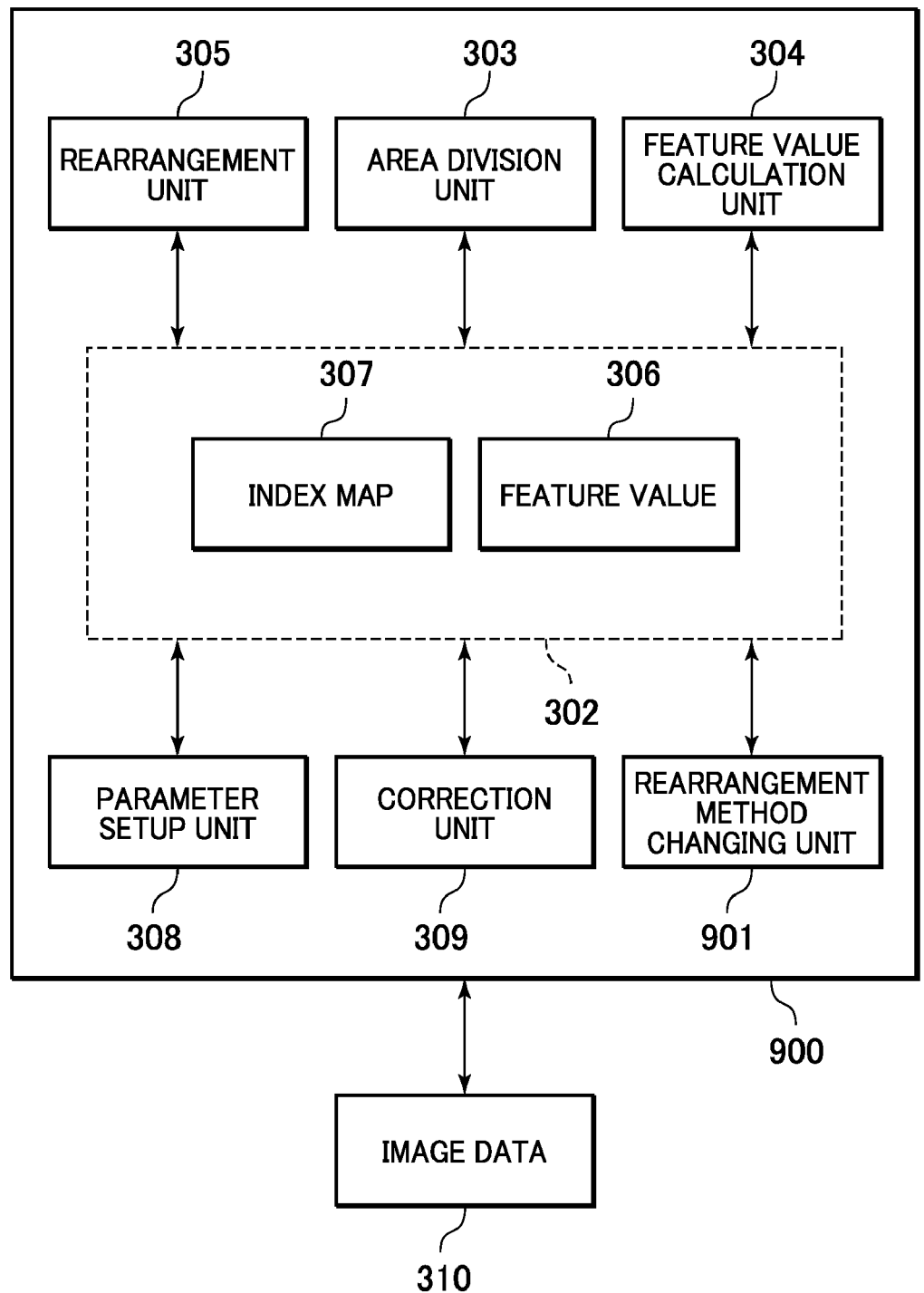
FIG. 9 illustrates color correction processing performed by an image processing apparatus according to a third embodiment of the present invention.

The image processing apparatus 900 in FIG. 9 includes a rearrangement method changing unit 901 in addition to the components shown in FIG. 3. The same reference numerals as are used in FIG. 3 are provided for corresponding components in FIG. 9. A detailed explanation will now be given for a component unique to the image processing apparatus 900 of this embodiment.

The rearrangement method changing unit 901 changes, in accordance with a user instruction, a method for rearranging colors in a color list box 203 in FIG. 10, which will be described later.

Specifically, in accordance with a user instruction, the rearrangement method changing unit 901 dynamically changes a method used for color rearrangement in the color list box 203 to either rearrangement in accordance with the frequencies of colors in image data 310 or rearrangement in accordance with the hues of individual colors.

Therefore, a user can rearrange the colors by using a desired method, and can easily identify a color to be corrected.

Figure 10:
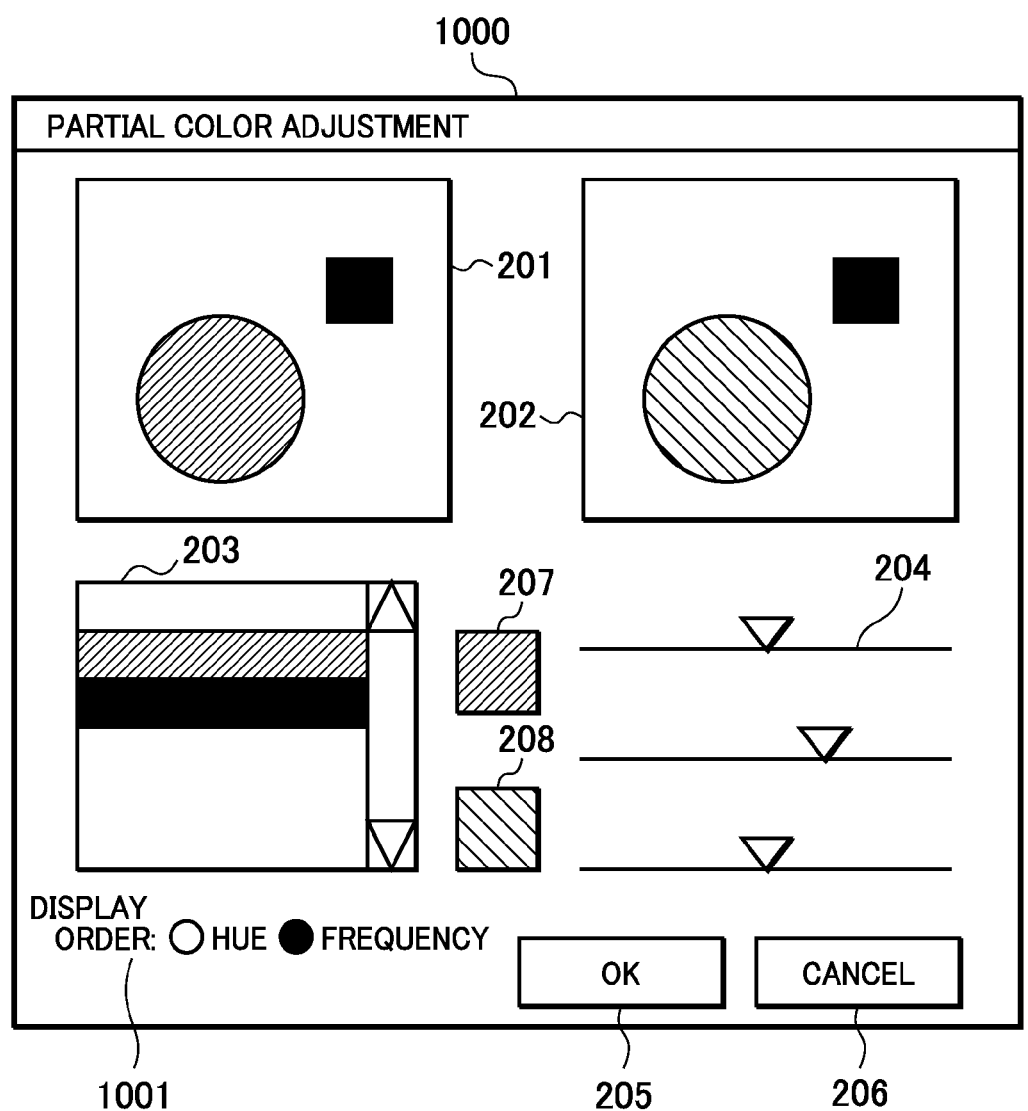
FIG. 10 shows an example application screen displayed by the image processing apparatus of the third embodiment.

FIG. 10 is a diagram showing an application screen 1000 displayed by a display device 105 when the CPU 1101 for the computer 102 of the image processing apparatus 900 has performed the image processing program.

Since the structure of the application screen 1000 in FIG. 10 is basically the same as that of the application screen 200 in FIG. 2, the same reference numerals as are used in FIG. 2 are provided for corresponding components, and only those components that are different will be explained.

The application screen 1000 in FIG. 10 includes check boxes 1001 that permit a user to designate a desired rearrangement method.

The order in which the colors in the color list box 203 are displayed is determined when the rearrangement unit 305 sorts the colors in accordance with the rearrangement method selected by the user using the check box 1001.

According to this embodiment, since the working condition and the order in which the colors in the color list box 203 are rearranged are changed in accordance with the desire of a user, the user can easily identify a color to be corrected.

Other Embodiments

The present invention can also be achieved when the computer (or a CPU or an micro-processing unit (MPU)) of a system or of an apparatus reads and executes program code for software, stored in a storage medium, that can provide the functions of the above embodiments.

In this case, the program code read from the storage medium provides the functions of the above embodiments.

Furthermore, modification of the invention is not limited to the case in which the functions of the embodiments are provided by executing the program code that is read by the computer. Further, such a case is also included in which, based on an instruction in the program code, the OS running on a computer performs part or all of the actual process.

Further, the following case is also included. The program code, read from a storage medium, is written to a memory that is prepared for a function extension card that is inserted into a computer or a function extension unit that is connected to the computer. Then, based on an instruction contained in the program code, the CPU provided for the function extension card or the function extension unit performs part or all of the actual process.

The above described program must permit a computer to perform the functions of the embodiments, and may be a program executed by using object code or an interpreter, or may be in the form of a script to be supplied to the OS.

A recording medium used to supply a program can be, for example, a RAM, a non-volatile RAM (NV-RAM), an optical disk, a magneto-optical (MO) disk, a CD-ROM, a CD-recordable (CD-R), a CD-rewritable (CD-RW), a digital versatile disk (DVD), a magnetic tape or a nonvolatile memory card on which the above described program can be stored. The program described above may also be supplied by being downloaded using another computer (not shown) or a database that is connected, for example, to the Internet, a commercial network or a local area network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-225846, filed Aug. 3, 2005, which is hereby incorporated by reference herein in its entirety.

What is claimed is:

1. An image processing apparatus comprising:
   an area division unit configured to divide a color image into a plurality of areas based on colors of the color image obtained through color reduction and index allocation;
   a feature value calculation unit configured to calculate pixel counts and representative colors for the areas obtained by division;
   an arrangement unit configured to employ the pixel counts to determine an order of the representative colors for the areas in accordance with a sum value of the pixel counts for each of the representative colors of the divided areas;
   an accepting unit configured to accept a user designation of a display order of the representative colors for the areas, the display order including the order in accordance with hues of individual colors;
   a display unit configured to concurrently display the color image, a corrected color image, and the representative colors for the areas in accordance with the determined order such that the representative colors are selectable by a user and the determined order is distinguishable by the user, the display unit changing the displayed order of the representative colors to the order in accordance with the hues of individual colors in a case where the accepting unit accepts the user designation of the display order indicating the order in accordance with the hues of individual colors;
   a color selection unit configured to select one of the representative colors to change to another color in accordance with a selection by the user;
   an adjustment unit configured to adjust pixels of the selected representative color based on input from the user; and
   a modifying unit configured to modify the corrected color image based on the adjusted pixels of the selected representative color.

2. An image processing apparatus according to claim 1, further comprising:
   a determination unit configured to employ the pixel counts obtained to determine display widths of the representative colors for the areas,
   wherein the display unit is configured to display the representative colors for the areas in accordance with the display widths that are determined by the determination unit.

3. An image processing apparatus according to claim 1, further comprising:
   a setup unit configured to set a correction value; and
   a color change unit configured to change the representative color selected in the image based on the correction value.

4. An image processing method comprising:
   dividing a color image into a plurality of areas based on colors of the color image obtained through color reduction and index allocation;
   calculating pixel counts and representative colors for the areas obtained by division;
   determining an order of the representative colors for the areas based on the pixel counts that are obtained, and in accordance with a sum value of the pixel counts for each of the representative colors of the divided areas;
   accepting a user designation of a display order of the representative colors for the areas, the display order including the order in accordance with hues of individual colors;
   concurrently displaying the color image, a corrected color image, and the representative colors for the areas in accordance with the determined order such that the representative colors are selectable by a user and the determined order is distinguishable by the user;
   changing the displayed order of the representative colors to the order in accordance with the hues of individual colors in a case where the accepted user designation of the display order indicates the order in accordance with the hues of individual colors;
   selecting one of the representative colors to change to another color in accordance with a selection by the user;
   adjusting pixels of the selected representative color based on input from the user; and
   modifying the corrected color image based on the adjusted pixels of the selected representative color.

5. A storage medium, on which is stored computer-readable program code for performing an image processing method comprising:
   dividing a color image into a plurality of areas based on colors of the color image obtained through color reduction and index allocation;
   calculating pixel counts and representative colors for the areas obtained by division;
   determining an order of the representative colors for the areas based on the pixel counts that are obtained, and in accordance with a sum value of the pixel counts for each of the representative colors of the divided areas;
   accepting a user designation of a display order of the representative colors for the areas, the display order including the order in accordance with hues of individual colors;
   concurrently displaying the color image, a corrected color image, and the representative colors for the areas in accordance with the determined order such that the representative colors are selectable by a user and the determined order is distinguishable by the user;
   changing the displayed order of the representative colors to the order in accordance with the hues of individual colors in a case where the accepted user designation of the display order indicates the order in accordance with the hues of individual colors;
   selecting one of the representative colors to change in accordance with a selection by the user;
   adjusting pixels of the selected representative color based on input from the user; and
   modifying the corrected color image based on the adjusted pixels of the selected representative color.

* * * * *